May 26, 1936.  A. CARPENTER ET AL  2,041,816

LIGHT SENSITIVE CELL

Filed Oct. 9, 1934

INVENTOR.
A. CARPENTER
E ROSS
BY W. E. Beatty
ATTORNEY.

Patented May 26, 1936

2,041,816

UNITED STATES PATENT OFFICE 2,041,816

LIGHT SENSITIVE CELL

Arthur Carpenter, New York, and Ernest Ross, Richmond Hill, N. Y., assignors to United Research Corporation, Long Island City, N. Y., a corporation of Delaware Application October 9, 1934, Serial No. 747,610

3 Claims. (Cl. 201—63)

The invention relates to a light sensitive cell and mounting therefor and is in the nature of an improvement over the cell construction shown in the patent to Lyon 1,948,766.

An object of the present invention is to avoid the use of spring contact terminals as shown in the above patent, and incidentally to avoid the function of the cap member 9 for retaining the cell in position.

Another object of the invention is to assign to the cap member 9 a new function namely, that of serving as the contact terminals, which leads to making the cap member in two parts.

Another object of the invention is to removably mount the selenium cell closely adjacent to a sound film.

The manner in which these objects are accomplished will be apparent from the following description and accompanying drawing wherein.

Figure 4:
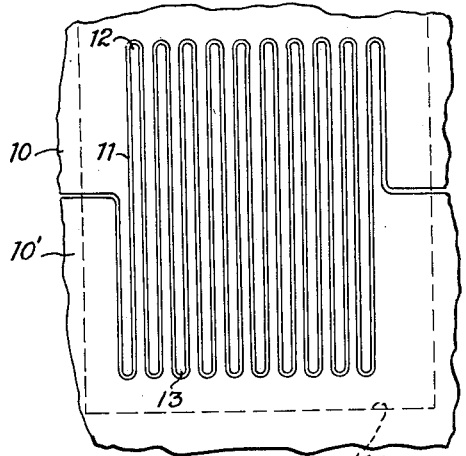
Fig. 4 is an enlarged view taken along the line 4—4 of Fig. 1 and showing the interdigitated electrodes.

More particularly describing the invention, the light sensitive cell 1 which is approximately 7/8 of an inch high, 5/8 inch wide, and 3/8 inch thick, is composed of a base member 2 which is preferably formed of porcelain, insolantite, bakelite, or other suitable insulating material. A recess 3 is provided in one side thereof to receive what I may term, an electrode assembly generally indicated at 4. The assembly 4 comprises a transparent base plate 5 such as glass, on the rear side of which is plated or fused a coating of hard metal 6, generally an alloy of platinum or palladium for example as in the patent to Carpenter No. 1,940,245. Over the metal 6 is plated another coating 7 of a softer metal such as silver so as to provide a base on which wires 8 and 9 may be soldered. After the layer of metals 6 and 7 has been deposited on the surface of the glass plate 5, it is separated into two electrodes 10 and 10' by tracing a sinuous path 11 thereon to form a series of interdigitated projections 12 and 13 as will be seen in Fig. 4. This trace may have rounded corners as in the patent to Carpenter No. 1,942,958. A thin layer of selenium 14 or other light sensitive material is then deposited on the face of the metal 7 to bridge the gap formed between the two electrodes 10 and 10'. This is usually accomplished by sublimation, that is, by vaporizing the light sensitive material from a solid and allowing it to condense upon the surface of the metal 7.

A cup-shaped piece of glass 15 is attached to the rear surface of the metal layer 7 and covers the selenium 14. In order to provide a secure bond therebetween, I provide an annular groove 16 formed in the outer surface 17 of the cup 15 to receive cement material 18. The groove 16 thereby provides for a large area of adhesion to securely hold the cup in position on the surface 17.

Light sensitive cells of this type are considerably affected by the presence of moisture and for this reason I apply a coating of moisture proof material 19 such as asphalt to the entire surface of the electrode assembly 4 except for a portion 20 at the front of the glass plate 5 to allow light to be transmitted to the interior of the cell.

A recess 21 is formed in the base 2 to allow the cup member 15 to be received therein. Also, a pair of vertically disposed grooves 22 and 23 are formed in the top and bottom of the base member 2 to receive the wires 8 and 9.

The upper and lower portion of outer surface of the base 2 are also recessed as at 24 and 25 to receive metal caps 26 and 27 which have soldered thereto the wires 8 and 9 as shown at 28 and 29 respectively. It will be seen therefore that the caps 26 and 27 serve to form contact terminals for the electrodes 10 and 10' as well as to form retainers to hold the assembly in place.

Figure 3:
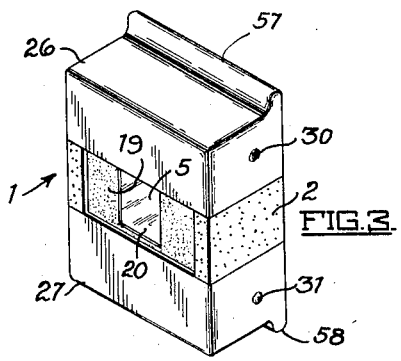
Fig. 3 is a perspective view of my invention.

In order to hold the caps 26 and 27 in position, I provide detents (not shown) in the base 2 wherein the sides of the caps are indented as at 30 and 31 in Fig. 3.

Figure 1:
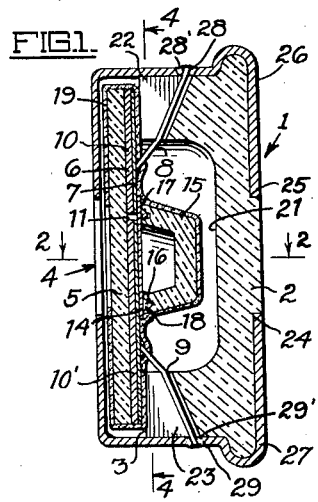
Fig. 1 is an enlarged sectional elevation view showing a preferred form of my invention.

The cell may be assembled as follows: The lead in wires 8 and 9 are soldered to their respective electrodes 10 and 10', the wires 8 and 9 at this time being substantially longer than as shown in Fig. 1. The electrode assembly 4 is then placed in the recess 3, and the caps 26 and 27 are fitted into the position shown in Fig. 1, after threading the wires 8 and 9 through the apertures 28' and 29' in the caps 26 and 27 respectively. The caps 26 and 27 are then fastened in position by indenting the same as at 30 and 31 in Fig. 3 into indentations, not shown, in the base 2, similar indentations, not shown, also provided in the opposite side of the cell. The wires 8 and 9 are now pulled to bring the electrode assembly 4 in contact with the bottom of the recess 3 as shown in Fig. 1 and the wires 8 and 9 are soldered to the caps 26 and 27 respectively as shown at 28 and 29, and the surplus portion of these wires 8 and 9 which extends beyond the caps is removed.

It will be seen from the above description that the invention is of the utmost simplicity and may be constructed economically in production quantities.

Figure 5:
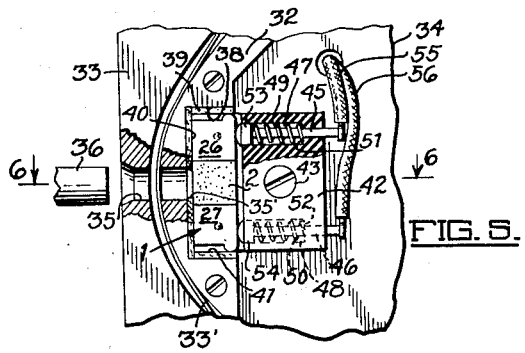
Fig. 5 is an elevational view, partly in section, showing the invention in a suitable holder and in connection with a sound reproducing apparatus.
Figure 6:
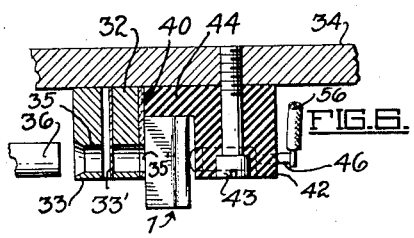
Fig. 6 is a plan section taken in a plane represented by line 6—6 of Fig. 5.
Figure 2:
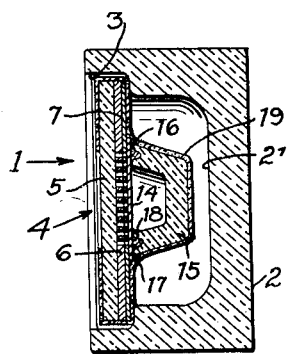
Fig. 2 is a plan section taken in a plane represented by line 2—2 in Fig. 1.

Figs. 5 and 6 show a cell 1 mounted in a holder provided in a sound reproducing unit such as a "talkie" picture projector wherein the film guides or light blocks 32 and 33, mounted on a vertical wall section 34, guide the film 33', having a sound track thereon, past an aperture or light passage 35 formed in the film guides 32 and 33. The aperture 35 is adapted to receive a ray of light from a light source of constant intensity (not shown) which is projected through a suitable optical system partly shown at 36 onto the sound track of the film 33'. A recess 38 is formed in the rear of the film guide 32 opposite the "light" aperture 35 and is lined with strips of insulation 39, 40, and 41. The strip 40 has an aperture 35' which registers in alignment with the aperture 35. To the rear of the recess 38 is mounted a contact block 42 preferably formed of bakelite or other suitable insulating material. The block 42 is shown as being mounted on the wall 34 by means of a cap screw 43 and has a ledge 44 extending into the rear of the recess 38 to insulate the cell 1 from the wall 34 and also to position the cell so that the light aperture 35 will register in alignment with the central portion of the cell which contains the interdigitated electrodes 10 and 10'. A pair of contact pins 45 and 46 are placed in counterbored holes 47 and 48 provided in the block 42. Springs 49 and 50 are mounted in the enlarged counterbores of the holes 47 and 48 and abut against the shoulders 51 and 52. The other ends of the springs 49 and 50 engage enlarged heads 53 and 54 of the pins 45 and 46 respectively. Wires 55 and 56 connect the contact pins 45 and 46 with a suitable sound amplifying system not shown.

As will be seen in Fig. 6, the cell 1 projects out a short distance from the guide 32 and the block 42 to permit grasping the projecting cell portion to allow for easy and quick insertion and withdrawal of the cell.

As shown in Figs. 1 and 3, the base 2 and the caps 26 and 27 are provided with shoulders or projections 57 and 58 whereby each end of the cell 1 is supported along a line instead of by an extended surface, in the recess 38 of the light block 32. This facilitates sliding the cell 1 into and out of the recess 38.

The spring pressed terminals or pins 45 and 46 constitute means for resiliently holding the cell 1 against the vertical wall of the recess 38 and in close proximity to the film 33', for sound reproduction purposes.

Having thus described the invention, what is claimed as new and desired to secure by Letters Patent, is:

I claim:

1. A light sensitive cell comprising a transparent plate, electrodes on said plate, light sensitive material bridging said electrodes, a base of insulating material having a recess adapted to receive said transparent plate, a pair of contact terminals on said base, each of said terminals comprising a metallic shell closely fitting an end of said base and overlying said recess, a plurality of apertures in said base, and a conductor in each of said apertures, each of said conductors being integrally united at one end to one of said electrodes, and at the other end to one of said terminals.

2. A light sensitive cell comprising a transparent plate, electrodes on said plate, light sensitive material bridging said electrodes, a base of insulating material having a recess adapted to receive said transparent plate, a pair of contact terminals on said base, each of said terminals comprising a metallic shell closely fitting an end of said base and overlying said recess, and leading-in conductors fastened to said electrodes and to said terminals respectively for retaining said plate against the bottom of said recess.

3. A light sensitive cell comprising a transparent plate, electrodes on said plate, light sensitive material bridging said electrodes, a cap sealing said electrodes, a base of insulating material having a recess adapted to receive said transparent plate and said cap, a pair of contact terminals on said base, each of said terminals comprising a metallic shell closely fitting an end of said base and overlying said recess, a plurality of apertures in said base, and a conductor in each of said apertures, each of said conductors being integrally united at one end to one of said electrodes, and at the other end to one of said terminals, each of said terminals extending over said plate.

ARTHUR CARPENTER.
ERNEST ROSS.